Nov. 20, 1934.    B. R. SHOVER    1,981,079
APPARATUS FOR HANDLING ROLLED MATERIAL
Filed May 7, 1932    4 Sheets-Sheet 1

INVENTOR
Barton R. Shover
by his attorneys
Byrnes, Stebbins, Parmelee & Blenko

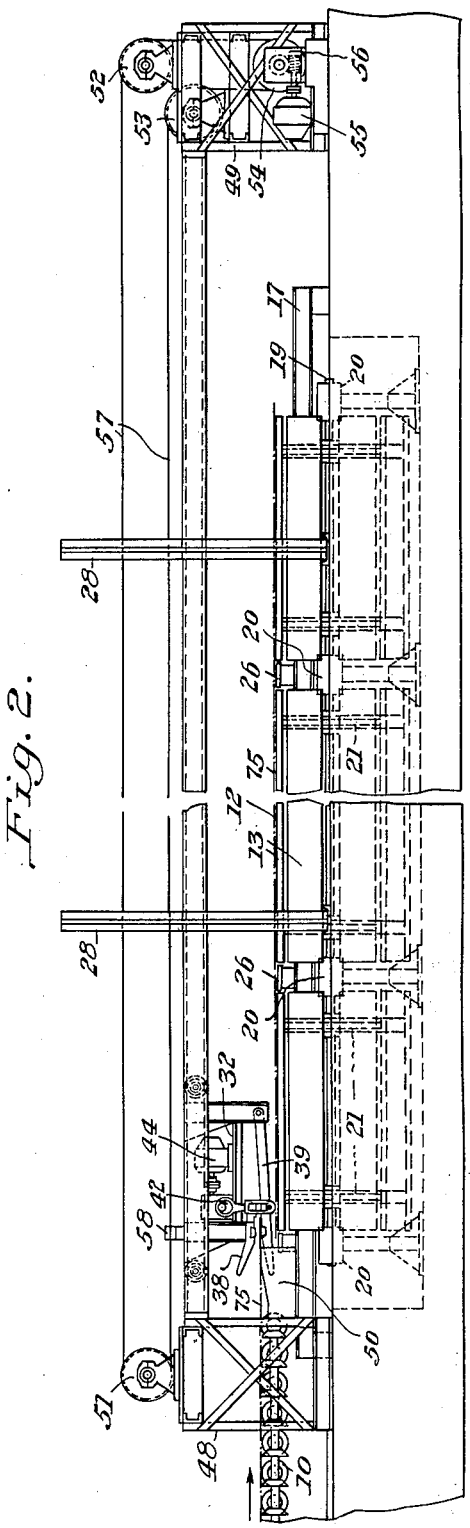
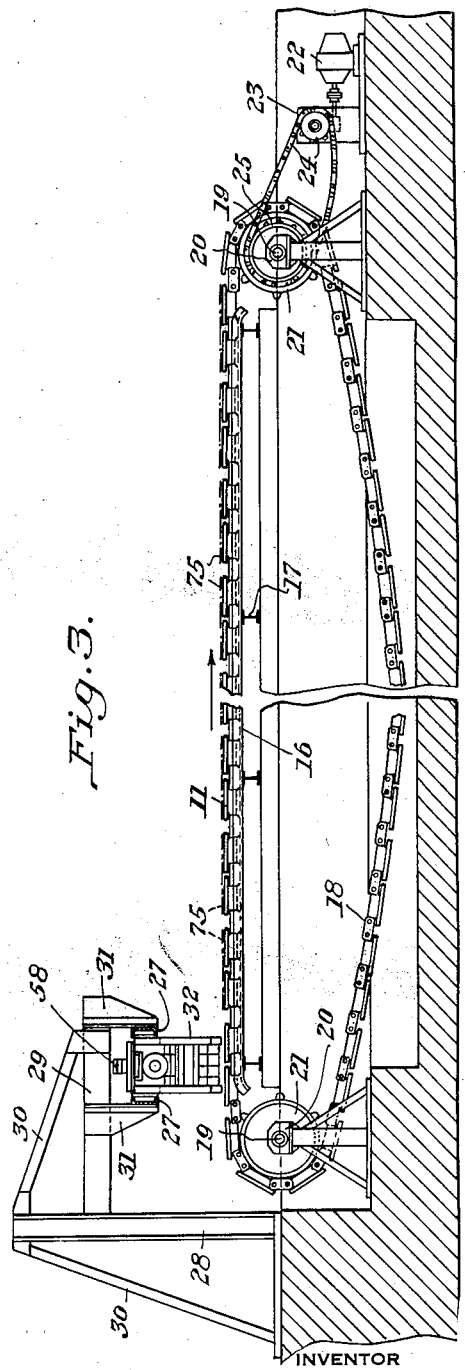

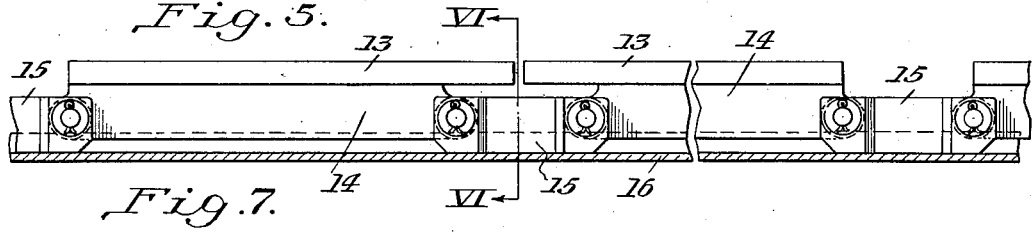
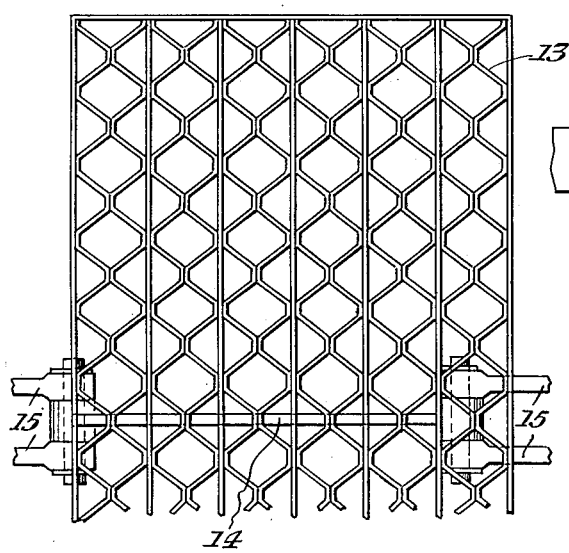
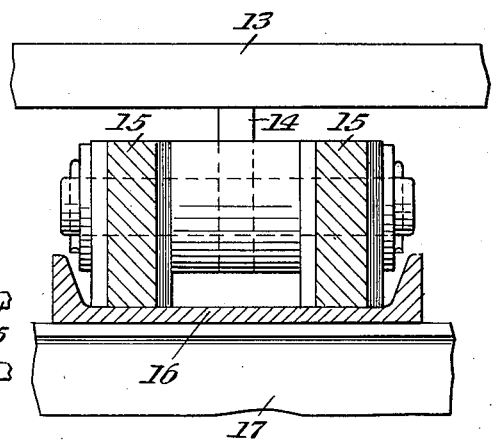
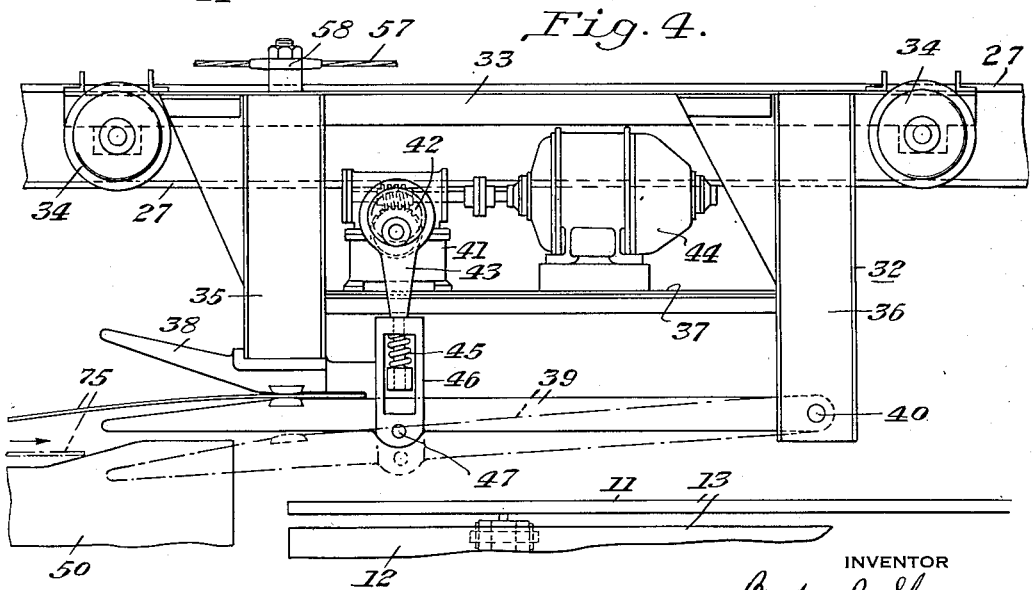

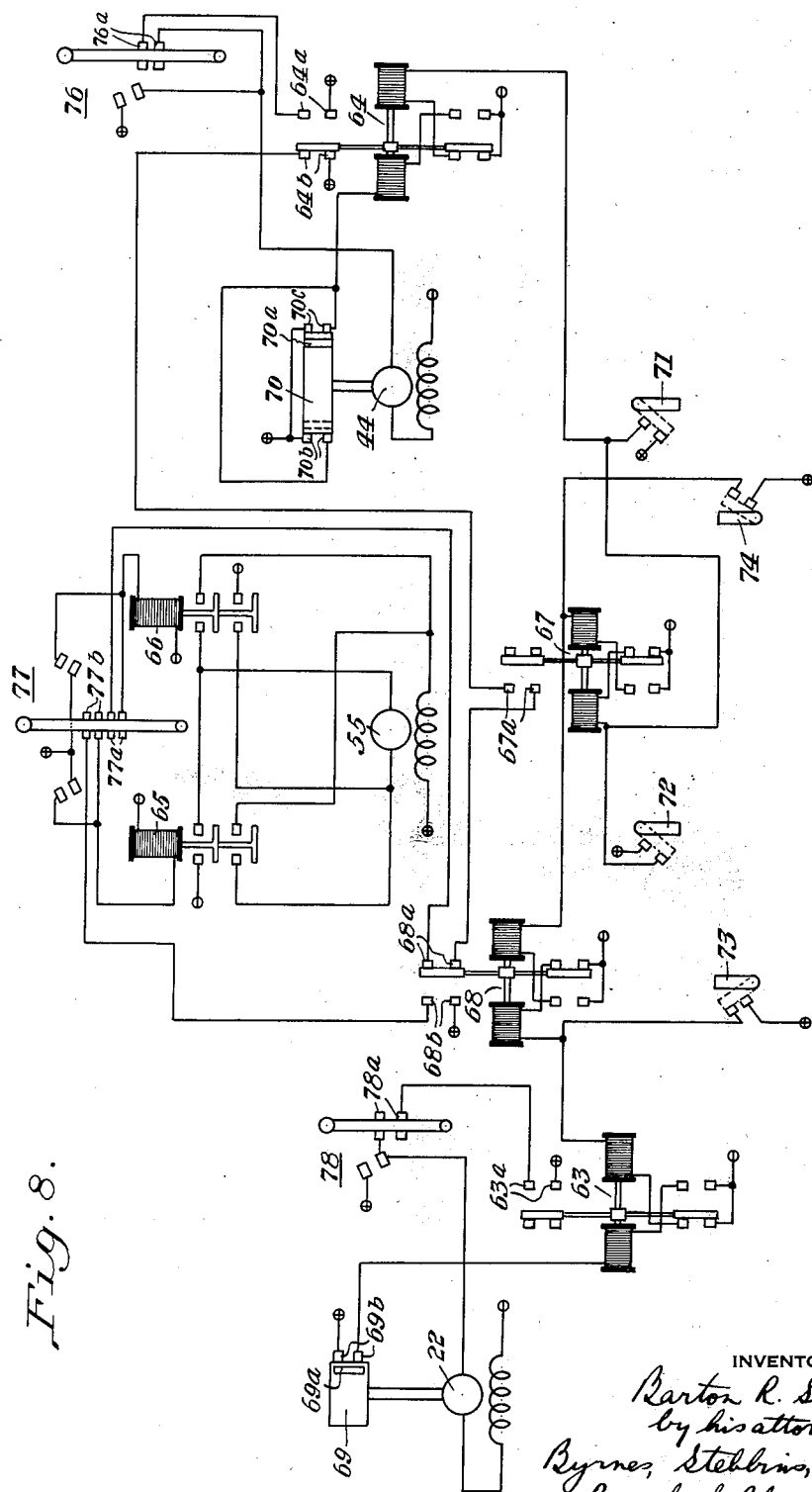

Patented Nov. 20, 1934

1,981,079

UNITED STATES PATENT OFFICE 1,981,079

APPARATUS FOR HANDLING ROLLED MATERIAL

Barton R. Shover, Pittsburgh, Pa.

Application May 7, 1932, Serial No. 609,832

6 Claims. (Cl. 80—42)

My invention relates to the handling of flat, thin material such as light metal plates, skelp or so-called "stripsheet" after its delivery from the mill in which it is rolled while heated to proper rolling temperature.

According to present practice, such material is delivered by a roll table to the entering side of a cooling bed composed of skids or rails. The material is engaged by projections on endless chains and thereby moved over on to the cooling bed, or pushing means may be employed for moving a succession of pieces from the roll table across the bed.

It is an object of the present invention to improve upon the present practice along the lines of providing automatic machinery to accelerate the production rate.

In accordance with my invention, I provide a wide cooling bed comprising a plurality of light, open-work supports linked together to form continuous traveling belts. A suitable drive for such belts is provided. A traveling carriage having gripping jaws thereon is adapted to travel the length of the cooling bed adjacent the entering side thereof so as to pull a length of material from the run-out table of a rolling mill, for example, on to the cooling bed by means of said gripping jaws. Automatic means for controlling the operation of the gripping jaws, the traveling carriage and the cooling bed itself, are provided, such means being adapted to be actuated by the movement of the material itself.

At the discharge side of the bed, delivery rolls are positioned for engaging the ends of cooled lengths so as to transfer them to other apparatus, such as shears, for further working.

For a complete understanding of the invention, reference is made to the accompanying drawings illustrating a present preferred embodiment of the invention, although it is to be distinctly understood that variations in the details of the embodiment disclosed may be made without departing from my broader claims. In the drawings:

Figure 2 is a side elevation thereof;

Figure 3 is an end elevation partly in section;

Figure 4 is a side elevation to enlarged scale of the carriage and its gripping jaws;

Figure 5 is a partial side elevation to enlarged scale of one of the belts constituting the cooling bed showing a guide therefor in section;

Figure 6 is a sectional view taken along the plane of line VI—VI of Figure 5;

Figure 7 is a partial plan view of one of the belts; and

Figure 8 is a schematic circuit diagram showing the apparatus for automatically controlling the operation.

Figure 1:
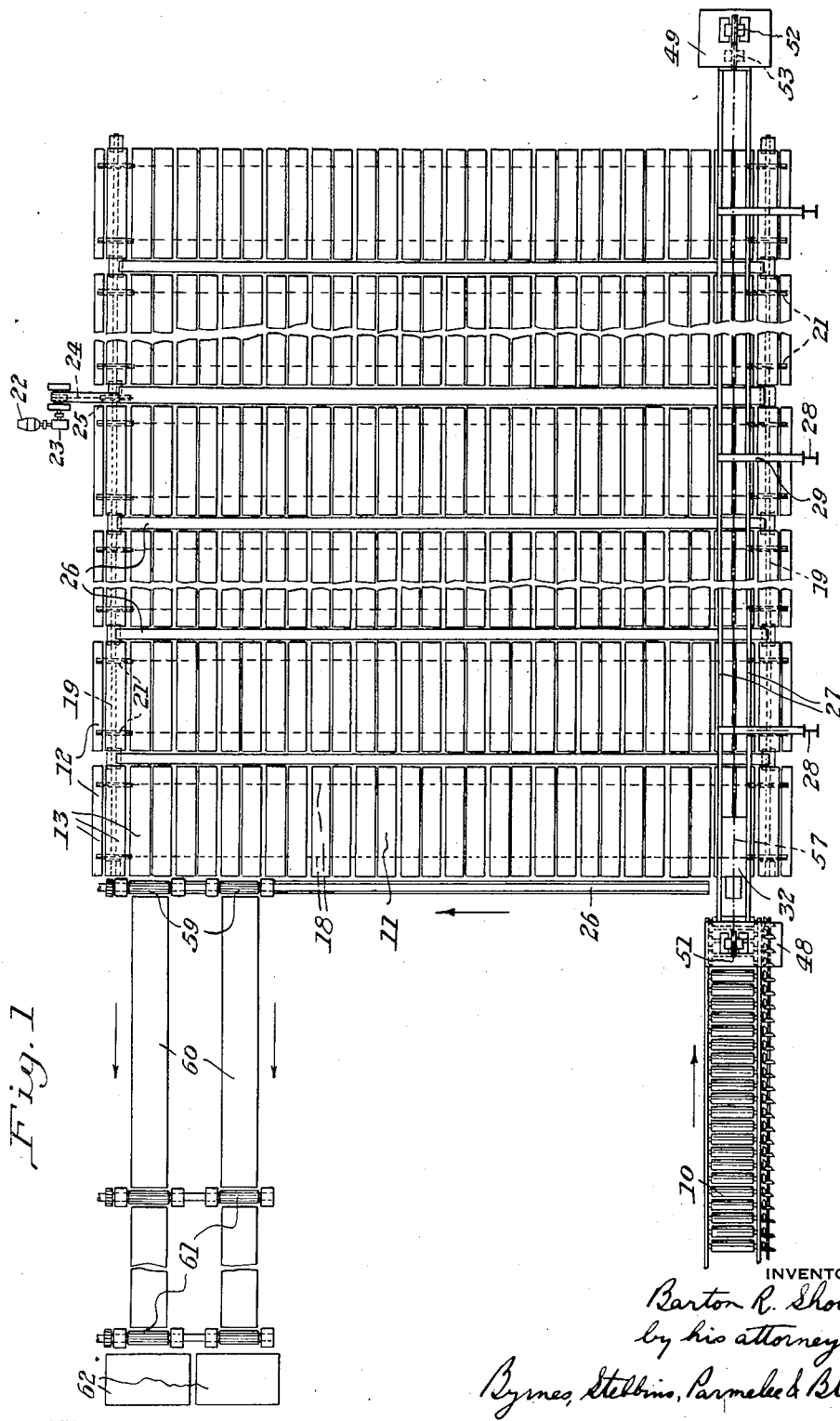
Figure 1 is a diagrammatic plan view of the invention with parts broken away.

Referring in detail to the drawings, rolled material is delivered from a rolling mill, for example, while still hot, to a run-out table 10. A cooling bed 11 has its entering side disposed in alignment with the run-out table and is adapted to move lengths disposed thereon transversely to permit uniform cooling thereof. The cooling bed 11 comprises a plurality of continuous belts 12 disposed side by side. Each belt 12 includes a plurality of grills or gratings 13 linked together.

The linkage of the gratings 13 is best illustrated in Figures 5 through 7. Each grating is provided with bearing plates 14 spot welded or otherwise secured thereto. Links 15 coupled in pairs to bearings at the ends of the plates 14 on adjacent gratings pivotally connect the latter together. The links 15 extend below the bottom edges of the plates 14 to constitute a supporting shoe adapted to slide along a track or guide channel 16. The channels 16 extend along the cooling bed, being supported by beams 17 arranged transversely thereof. As shown in Figure 7, the gratings 13 are composed of an open meshwork, the parts of which may be riveted or spot welded.

On each of the belts 12, the gratings 13 are mounted in pairs which are closer to each other than either grating of the pair is to the adjacent grating of the next pair. The closely associated pairs of gratings in the several belts 12 are in alignment and the effect is to provide a substantially continuous supporting surface of the width of two gratings. This is preferable to the use of a single wide grating in that greater flexibility of the belts is obtained. It will be apparent that the bearing plates 14 secured to the gratings, with the links 15, constitute continuous chains 18 for supporting the belts. As above explained, while crossing the cooling bed, these chains traverse the guide channels 16. On opposite sides of the cooling bed, sprocket shafts 19 are mounted in suitable bearings. The shafts 19 are preferably made in sections and provided with a plurality of bearings 20 positioned between adjacent belts and at the ends of the bed. Sprockets 21 guide the belts around the shafts 19. The lower or return run of the belts is freely suspended beneath the level of the cooling bed.

A motor 22, through a speed reducing gear 23, and a chain and sprocket drive 24, actuates a driving sprocket 25 on the shaft 19 at the exit side of the bed 11.

Between successive belts 12 and at the end of the cooling bed adjacent the run-out table 10, I position stationary grating sections 26 at the same level as the gratings 13 forming parts of the belts 12. A substantially continuous supporting surface is thus provided for material moving across the cooling bed even though the belts 12 are spaced apart. The material moving across the cooling bed slides easily along the stationary sections 26.

A trackway comprising rails 27 is suspended over the entering side of the cooling bed 11 by means of a structural framework including columns 28, cantilevers 29, braces 30 and hangers 31. A carriage 32 has a frame 33 provided with wheels 34 traveling on the trackway provided by the rails 27. Hangers 35 and 36 depending from the frame 33 support a platform therebetween. Stationary jaw members 38 are carried on the hangers 35 and movable jaw members 39 are pivoted to the hangers 36 on a shaft 40 carried thereby. A speed reducing gearing 41 is mounted on the platform 37 and has a pair of eccentrics 42 with links 43 depending on either side of the platform. A motor 44 is coupled to the reducing gearing 41. The links 43 have a resilient connection 45 with yokes 46. A pin 47 connects the yokes 46 and the jaw members 39 so that the entire assembly moves as a unit on rotation of the eccentrics 42. Guides 50 extending beyond the ends of the run-out table 10 serve to direct the ends of material delivered thereby between the jaws 38 and 39 of the carriage 32.

At the ends of the rails 27, sheave supports 48 and 49 are located. A sheave 51 is mounted in the support 48 and sheaves 52 and 53 and a sheave or drum 54 are journaled in the support 49. The sheaves 51, 52 and 53 are guide sheaves, while the sheave 54 is a driving sheave. A motor 55 working through a speed reducing gearing 56 drives the sheave 54. A cable 57 traverses the sheaves 51, 52 and 53 and the sheave or drum 54 and terminates in a connection 58 on the carriage 32. The carriage, therefore, may be actuated along the trackway by energizing the motor 55.

Adjacent the exit side of the bed 11, delivery rolls 59 are positioned for seizing the end of a length for withdrawing it from the bed. These rolls may be pinch rolls or magnetic rolls and serve to move the material along tables 60 to other delivery rolls 61 and thence to other means for working on the lengths, for example, shears 62.

In addition to the apparatus already described, the invention contemplates a system for automatically controlling the movements of the various elements. Such system is shown diagrammatically in Figure 8. In Figure 8, the driving motor for the cooling bed, the jaw motor and the carriage reciprocating motor are indicated by the same reference numerals as in the previous description. The cooling bed drive motor 22 and the jaw closing motor 44 always operate in the same direction and are controlled by relays 63 and 64, respectively. The carriage reciprocating motor 55, of course, must reverse, and forward and reverse relays 65 and 66 are therefore provided for this motor. In addition, relays 67 and 68 similar to the relays 63 and 64 assist in the control of the motor 55. The relays 63, 64, 67 and 68 each have a contact movable between two extreme positions. The contact is moved from one extreme position to the other by the energization of one of two operating coils. Each relay controls a set of main contacts and a set of auxiliary or cut-off contacts, the function of which is to deenergize either operating coil immediately on movement of the contact caused by the energization thereof. Other types of relays, of course, may be substituted for the specific type described.

The motors 22 and 44 are provided with drum type limit switches 69 and 70. Flag switches 71, 72, 73 and 74 complete the automatic control system. The conditions illustrated in Figure 8 are those which normally obtain upon the commencement of the cycle of operations necessary for the delivery of a length from the run-out table 10 to the cooling bed 11. The flag switch 71 is preferably mounted in the jaws of the carriage 32 so it will be closed upon advancement of the end of a length such as that indicated at 75 into the jaws. The closing of the flag switch 71 completes the circuit for the right-hand operating coil of the relay 64 extending from one side of a suitable control bus indicated by a plus sign within a circle, through the switch 71, the right-hand operating coil of the relay 64, the cut-off contacts therefor, to the other side of the control bus indicated by a minus sign in a circle. The left-hand operating coil of the relay 67 is similarly energized. Both relays operate, the relay 64 to bridge its contacts 64a and the relay 67 to bridge its contacts 67a. The operation of the relay 67 produces no immediate results but the operation of the relay 64 completes a circuit from one side of a main supply bus indicated by a plus sign in a circle through the contacts 64a of the relay 64, contacts 76a of a manual controller 76 for the motor 44, the contact 76a being closed when the controller is in the off position, through the motor 44 to the other side of the main supply circuit indicated by a minus sign in a circle.

The completion of the circuit for the motor 44 causes it to operate to raise the jaws 39 so that the length 75 is tightly gripped between the jaws 38 and 39.

On commencement of the operation of the motor 44, a contact 70a on the drum of the limit switch 70 has the position shown in solid lines in Figure 8. As the motor operates to close the jaws, the limit switch drum turns until the contact 70a bridges fixed contact 70b as the jaws engage the length 75. A circuit is thereupon completed for the left-hand operating coil of the relay 64. The resulting energization of the coil operates the relay back to the illustrated position. The circuit for the motor 44 is thus opened and the motor is deenergized. The momentum of the motor, however, is such that it continues to rotate for a short time whereby the contact 70a moves away from the contacts 70b to the position shown in dotted lines in Figure 8. The relay 64 also bridges its contacts 64b and completes a circuit for the relay 66 of the motor 55, said circuit including also the contacts 67a of the relay 67 and contacts 68a of the relay 68, as well as fixed contacts 77a of a manual controller 77 for the motor 55. The operation of the relay 66 starts the motor 55 whereby the cable 57 is shifted over the sheaves 51, 52 and 53 in a direction such that the carriage 32 moves to the right as viewed in Figure 2. Since the jaws have gripped the length 75 tightly, the movement of the carriage pulls the length out on to the entrance side of the cooling bed 11.

The flag switch 72 is located at any convenient position so that it is operated when the length 75 has reached the position indicated in dotted lines in Figure 2. The closure of the flag switch 72 completes a circuit for the right-hand coil of the relay 64. The circuit for the left-hand coil of the relay 67 is opened at its cut-off contacts so that no energization thereof takes place. The resulting operation of the relay 64 opens the circuit for the relay 66 whereby the motor 55 is stopped. The circuit for the motor 44 is also reclosed. The jaw motor 44 is thereupon operated in the same direction as in the first case. The limit switch 70 is constructed and adjusted so as to deenergize the motor 44 at substantially the upper and lower limits of the travel of the pivoted jaws 39. After the jaws have been closed and the motor stopped, therefore, further rotation of the motor will open the jaws. The closure of the flag switch 72 thus tends to open the jaws and release the length 75. The motor 44 is deenergized when the contact 70a bridges fixed contacts 70c, after which the motor overtravels to open the stopping circuit. The bridging of the contacts 70c deenergizes the left-hand coil of the relay 64 to restart the motor 55. The carriage 32, therefore, continues to travel toward the right until the flag switch 73 is operated. This flag switch is preferably positioned a short distance beyond the switch 72.

The closure of the flag switch 73 completes a circuit for the left-hand coil of the relay 68 and the right-hand coil of the relay 63. The operation of the relay 68 to bridge its contacts 68b completes a circuit for the reverse relay 65 including contacts 77b of the controller 77. The motor 55 is thereupon reversed and the carriage 32 begins to move toward the left.

At the same time, the operation of the relay 63 completes a circuit for the motor 22, including contacts 63a of the relay, contacts 78a of a manual controller 78 for the motor 22, and the motor itself. The limit switch 69 has a contact 69a which is normally in the position illustrated in Figure 8. When the motor 22 operates, however, the contact 69a is advanced until it engages contacts 69b. The adjustment of the limit switch is preferably such that the motor 22 advances the table 10 by substantially the width of the material being handled before the contact 69a engages the contacts 69b. On the occurrence of the latter condition, a circuit is completed for the left-hand coil of the relay 63 to open the circuit of the motor 22. Overtravel of the motor moves the contact 69a away from the contact 69b. The positions of successive lengths positioned side by side on the cooling bed are indicated at 75 in Figure 3.

As the motor 55 continues to operate in the reverse direction, the carriage 32 returns to its original position, whereupon the flag switch 74 is closed. A circuit is thereby completed for the right-hand operating coil of the relay 68 which opens the contacts 68b to stop reverse travel of the carriage. The flag switch 74 also completes a circuit for the right-hand coil of the relay 67 to open the contact 67a to prevent immediate reversal of the carriage movement, since the relay 64 is in the left-hand position. The described conditions remain unchanged until the flag switch 71 is again closed by a length of material entering the jaws 38 and 39, whereupon the entire cycle is repeated.

The system may be manually controlled by means of the controllers 76, 77 and 78 in a manner which will be obvious from an inspection of the drawings. In any case, manual control of any one of the motors interrupts the automatic control thereof for the time being, but the automatic control is restored as soon as the manual controllers are released.

After a length of material has been placed on the bed 11 and traversed thereacross, it may be removed by the pinch rolls 59. Preferably, each length is positioned on the bed so that its trailing end slides across the stationary portion of the bed adjacent the belt 12 on the mill side thereof. The pinch rolls 59 are normally released so that the end of the piece traveling along the stationary section 26 at the mill end of the table passes between the rolls. Tightening down on the rolls will result in the material being drawn off from the cooling bed on to the table and delivered by the rolls 61 to the shears 62. As before stated, magnetic rolls may replace the pinch rolls 59. Magnetic rollers could also be incorporated between portions of the stationary sections 27. As a further alternative to the pinch rolls, a carriage traversing a suitable trackway, similar to the carriage 32, could be employed to pull the lengths off the bed. The cooled lengths may also be dumped on to skids at the end of the bed to be handled by a crane or otherwise. Any number of sets of pinch rolls 59 or their equivalent may be employed in order to remove the material from the bed at the desired rate.

It will be apparent from the foregoing description that the invention is characterized by numerous advantages. The cooling bed is practically level so that the material thereon cools without objectionable kinks. The cooling bed is of lightweight openwork construction so as to permit ready cooling of material carried thereon. The material is supported between belts by the stationary sections of the bed so that there is a minimum of sagging of the material with the result that the finished product is practically smooth when cooled. The material cools uniformly because it is supported throughout by means of the same physical characteristics so that there is no possibility of warping as a result of non-uniform cooling. By making the gratings of material having a high heat conductivity, more rapid cooling of the material is effected.

The invention makes it possible to pile hot rolled material in as many thicknesses as desired for simultaneous cooling and shearing.

Although I have illustrated and described but a single preferred embodiment of the invention, it will readily be recognized that other embodiments differing in specific details may be made without departing from the spirit of the invention or sacrificing advantages thereof as herein set forth and defined in the appended claims. The carriage 32, for example, instead of being pulled back and forth by means of the cable 57, may have a driving motor mounted directly thereon for actuating the carriage in the manner of the ordinary bridge crane. The supply of current for the driving motor, as well as any necessary control circuits, could be provided for by trolley wires, as is already well known.

I claim:

1. The combination with a cooling bed, means for delivering strip material thereto, and driving means for effecting sidewise movement of the material along the bed, of means actuated by said delivery means for controlling the said driving means, and means actuated by material advancing to the delivery means effective to cause said means to grip the material.

2. The combination with a cooling bed, a motor for driving the bed, and means for delivering strip material to the bed for movement therealong, of means actuated by the delivery means for causing operation of the motor driving the cooling bed, and material-actuated means effective to cause the delivery means to grip material advancing thereinto.

3. Apparatus for handling hot strip material comprising a cooling bed, means for delivering hot material in strip form across the width of said bed for sidewise movement therealong, a motor for driving the bed, and means actuated by the positioning of the strip on the delivery means effective to cause movement of the delivery means, and means actuated by such movement for energizing said motor.

4. Apparatus for handling hot strip material comprising a cooling bed, means for pulling material from a runout bed of a rolling mill on to said cooling bed, means actuated on receipt of material by said pulling means effective to cause movement of the pulling means, means for effecting a step-by-step advancement of the cooling bed, and means operated by the movement of said pulling means to place a strip on the cooling bed, for causing said drive to effect the operation of the bed through one step.

5. Apparatus for supporting flat, hot metal lengths while cooling comprising a cooling bed, a roll table in alinement with one edge of said bed, and means for seizing material on the roll table and pulling it across the alined edge of the bed, said bed comprising a plurality of moving belts composed of linked gratings, stationary supporting gratings between said belts, and rigid rails guiding horizontal movement of the belts to maintain the material flat transversely, said moving and stationary gratings being effective to prevent sagging of the material longitudinally.

6. The apparatus defined by claim 4 characterized by means actuated by movement of the pulling means effective to cause the pulling means to release the material, move on and then reverse.

BARTON R. SHOVER.